(12) United States Patent
Sakurai et al.

(10) Patent No.: US 6,477,136 B2
(45) Date of Patent: Nov. 5, 2002

(54) OPTICAL RECORDING MEDIUM

(75) Inventors: Yuichi Sakurai, Toride; Yoshiyuki Nagataki, Yawara-mura; Kouji Takazawa, Abiko; Mitsuru Ito, Zama; Takuya Hayashi, Toride, all of (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/863,279

(22) Filed: May 24, 2001

(65) Prior Publication Data

US 2001/0053120 A1 Dec. 20, 2001

(30) Foreign Application Priority Data

May 24, 2000 (JP) .................................. 2000-152220
Jun. 16, 2000 (JP) .................................. 2000-181202

(51) Int. Cl.$^7$ ................................................ G11B 7/24
(52) U.S. Cl. ................................ 369/275.4; 369/275.1
(58) Field of Search ........................ 369/275.4, 275.1

(56) References Cited

U.S. PATENT DOCUMENTS 6,212,330 B1 * 4/2001 Ha et al. ................. 369/275.4
6,219,330 B1 * 4/2001 Ahn et al. ............ 369/275.4 X
6,288,998 B1 * 9/2001 Taira ....................... 369/275.4

FOREIGN PATENT DOCUMENTS

| JP | 8-129780 | * | 5/1996 | ............ G11B/7/24 |
| JP | 9-180262 | * | 7/1997 | ............ G11B/7/24 |

* cited by examiner

*Primary Examiner*—Aristotelis M. Psitos
(74) *Attorney, Agent, or Firm*—Birch, Stewart, Kolasch & Birch, LLP

(57) ABSTRACT

An optical recording medium which can precisely reproduce recording pits formed in pregrooves having width narrower than the diameter of a reproducing beam spot, and which can reduce the jitter and the block error rate, wherein the following unequal equation is satisfied:

$$0 < b \leq a < Dp \leq Dg \qquad (1)$$

where Dg is a maximum depth of the pregrooves, Dp is a maximum depth of the prepits, a is a depth of edge parts between the pregrooves and the prepits on the inner peripheral side of the prepits, and b is a depth of the edge parts on the outer peripheral side of the prepits.

4 Claims, 3 Drawing Sheets

INNER PERIPHERY

INNER PERIPHERY

INNER PERIPHERY

OPTICAL RECORDING MEDIUM

BACKGROUND OF THE INVENTION

1. Field of the Invention

The present invention relates to an optical recording medium comprising a substrate formed therein with prepits between pregrooves, and an optical absorption layer and an optical reflection layer which are formed on the substrate, and in particular, to a high density optical recording medium which can reduce the error rate of address signals, and the jitter and the block error rate of recording signals.

2. Related Art

These years, that is, in the highly information-oriented era, optical recording media which can deal with several various information become noticeable. These optical recording media are classified into a read-only recording medium on which no data can be recorded, and a write-once type optical recording medium on which date can be only once written, and a rewritable recording medium on which data can be rewritten many times. Of these optical recording media, the write-once type optical recording medium is suitably used as a data storage medium for official documents and important documents since data recorded once thereon cannot be altered for defrauding or the like. As such a write-once type optical recording medium, there has been know, for example, a CD-R (compact disc-recordable).

This CD-R which is a write-once type CD has an optical absorption layer and an optical reflection layer formed on a substrate and made of organic pigment, and which can produce output signals which are in conformity with a CD format during reproduction. The substrate of this CD-R is spirally or concentrially formed thereon with pregrooves for tracking. In order to record data on the CD-R, a laser beam is irradiated on the substrate along the pregrooves so as to decompose or alter the optical absorption layer. Thus, recording marks are formed in the recording beam irradiated part of the optical absorption layer within pregrooves. When a reproduction beam is irradiated along the pregrooves, data can be read since a difference in optical reflectivity is caused between the parts on which the recording marks are formed, and parts on which no recording marks are formed, and since the difference in the optical reflectivity can be used for reading the data. The laser beam used for recording and reproducing to and from the CD-R usually has a wavelength in a range from 770 to 830 nm.

These years, it has been demanded that the recording capacity of a recording medium is further increased. In order to increase the recording capacity, there has been proposed such a method that the wavelength of the laser beam used for recording and reproducing is shortened so as to decrease the diameter of a beam spot in order to enhance the recording density. As to a high density recording medium in association with this method, there have been proposed a DVD (digital versatile disc) and a DVD-R (digital versatile disc-recordable) (refer to, for example, Electronic Technology, August, 1996, on page 101). A laser beam used for recording and reproduction of this DVD-R has a wavelength in the range from 630 to 660 nm.

Pregrooves for tracking are spirally and concentrically formed on a substrate of a DVD-R, as shown in FIG. 5, and prepits 41 for address signals are formed at predetermined pitches between adjacent pregrooves 42, 42' (in lands therebetween). Further, these prepets are provided in combination with their inner peripheral side pregrove 42. Track pitches of the pregrooves in the DVD-R are in a range from 0.7 to 0.8 $\mu$m, which is extremely dense in comparsion with track pitches of the pregrooves in the CD-R, which are 1.6 $\mu$m.

Accordingly, as to the DVD-R, the width of the pregrooves becomes smaller than the diameter of the beam spot for recording and reproduction, and the lands laid on both sides of a pregroove are in part included within the beam spot with which the pegroove is scanned for recording and reproduction. In this case, if the prepits are present in either an inner peripheral side land or an outer peripheral side land in the vicinity of recording pits formed in the pregroove, a part of the prepits is included within the spot for recording and reproduction when the recording pits are reproduced. Thus, a difference in obtained reproduction intensity is caused between a recording pit in the vicinity of a prepit, and a recording pit which is far from a prepit even though the recording pits have one and the same pit length. Accordingly, these pits are reproduced as recording pits having different pit lengths. As a result, there has been caused such a problem that jitter and block error rate become high. Further, in order to solve this problem, there has been proposed such a method that the size of these prepits formed in the land between the pregrooves is decreased. However, in this method, the intentity of prepit signals becomes smaller, and accordingly, there has been caused such a problem that the error rate of address signals becomes high.

SUMMARY OF THE INVENTION

The present invention is devised in order to solve the above-mentioned problems, and accordingly, an object of the present invention is to provide a high dense optical recording medium in which prepits formed (in lands) between pregrooves can be precisely reproduced so as to reduce an error rate of address signals, and recording pits formed in the vicinity of the prepits can be precisely reproduced, thereby it is possible to reduce jitter and a block error rate of recording signals.

To the end, according to an object of the present invention, there is provided an optical recording medium comprising a substrate formed therein prepits in (lands) between pregrooves, the pregrooves and the prepits being set apart from each other by edge parts therebetween, and an optical absorption layer and an optical reflection layer which are formed on the substrate, the prepits are preferably formed so as to satisfy the following inequal equation (1):

$$0<b \leq a<Dp \leq Dg \tag{1}$$

where Dg is a maximum depth of the pregrooves, Dp is a maximum depth of the prepits, a is a depth of an edge parts on the inner peripheral side of the prepits,and b is a depth of the edge part on the outer peripheral side of the prepits.

FIGS. 2 and 3 show a specific example of the shape of the prepits formed (in lands) between the pregrooves, which can satisfy the above-mentioned condition, and are a perspective view and an enlarged partly sectional view, respectively, illustrating a sectioned structure obtained by cutting the substrate by a plane that is orthogonal to the longitudinal direction of the pregrooves (pregroove direction) and including prepits. It is noted that the pregrooves and the prepits are set apart from each other by eges parts 23, 23' therebetween.

Referring to FIG. 3, the maximum depth Dg of the pregrooves 22, the maximum depth Dp of the prepits 21, the depth a of the edge parts 23 on the inner peripheral side of the prepits 22, and the depth b of edge parts 23' on the outer peripheral side of the prepits 21 satisfy the above-mentioned unequal equation (1). As shown in FIG. 5, in such a case that no edge parts are formed in the prepits formed (in lands) between grooves 42, 42', as in the conventional one, so that the pregrooves and the prepits are continuously formed, a part of a prepit which is adjacent to the pregroove is recognized as a recording pit. On the contrary, according to the present invention, since the edge part between the pregroove and the prepit is formed so that it is higher than the bottom surface of the prepit, and in more detail, the depth of the edge part between the prepit and the pregroove is set to be less than 95% of the maximum depth Dp of the prepit, it is possible to prevent the prepit from being recognized as a recording pit even though a part of the prepit is contained in the reproduction spot. Thus, recording pits can be appropriately reproduced, irrespective of the presence of a prepit adjacent to a recording pit. Accordingly, the optical recording medium according to the present invention can reduce jitter and a block error rate of recording signals.

Further, since a signal of a prepit 21 on the outer periheral side, which is in a pair with a pregrooves 22 can be appropriately reproduced with a sufficient intensity, the depth a of the edge parts 23 on the inner periheral side of the prepits 21 is set to be greater than 20% of the maximum depth Dp of the prepits 21 while the maximum depth Dp of the prepits 21 is set to be greater than 50% of the maximum depth Dg of the pregrooves 22. Further, the pripits 21 is adjacent also to the pregroove 22' on the outer peripheral side of the prepits 21, and the depth b of the edge parts 23' on the outer peripheral side of the prepits, is preferably set to be equal to or less than the depth a of the edge parts 23 on the inner peripheral side of the prepits. Accordingly, the optical recording medium according to the present invention can reduce an error rate of the address signals.

Further, according to the present invention, it is preferable to form the prepits so as to satisfy the following unequal equation (2):

$$0 < B \leq A \qquad (2)$$

where A is the length of the edge parts 23 on the inner peripheral side of the prepits 21 as shown in FIG. 4, in the pregroove direction, and B is the longth of the edge parts 23' on the outer peripheral side of the prepits 21 in the pregroove direction.

The shape of the prepits 21 according to the present invention is optional if the prepits are adjacent to pregrooves 22, 22' on both sides, and the lengths A, B of both edges of the prepits can satisfiy the above-mentioned unequal equation (2).

The substrate of the optical recording medium according to the present invention, may be made of arbitrary materials having optical transparency, which is transparent resin such as polycarbonate resin or polymethacrylate methyl resin. Although the substrate can be manufactured by injection-molding the above-mentioned resin material with the use of, for example, an injection molding machine mounted thereon with a stamper formed therein with a preformat pattern, the present invention should not be limited to this manufacturing method, but it may be manufactured with the use of a 2P (Photo-polymerizatoin) method. The intervals of the pregrooves for tracking formed at least one surface of the substrate is preferably set in a range from 0.6 to 0.9 $\mu$m in order to increase the recording density. Further, the depth of the pregrooves is preferably set in a range from 100 to 250 nm in order to obtain reproducing signals with the use of an optical interference effect.

The optical absorbing layer of the optical recording medium according to the present invention is made of azo group organic pigment, cyanin groupd organic pigment or pigment obtained by mixing these pigments. The optical absorbing layer may be formed by spin-coat, vacuum evaporation or the like, and among them, a spin coat process using a solvent is more preferable. As to the solvent using during the formation of the optical absorbing layer, ethylcellosolve, methylcellosolve, methanol, tetrafluoro propanol or the like may be used. The thickness of the optical layer to be formed is preferably in a range from 20 to 200 nm, Further, the optical layer may be added therein with singlet oxygen quencher in order to prevent optical deterioration of the cyanin pigment or the azo pigment.

In the optical recording medium according to the present invention, the optical reflecting layer may be made of metal such as Au, Ag, Cu, Al or alloy containing, as a main component, one of these metals, and may be formed by vacuum evaporation, sputtering, ion plating or the like. The thickness of the optical reflecting layer is preferably in a range from 0.02 to 0.5 mm.

In the optical recording medium according to the present invention, a protecting layer may be further formed on the optical reflecting layer. The protecting layer may be made of ultraviolet curing resin, epoxy resin, acrylic resin, silicon resin, urethane resin or the like. The thickness of the protecting layer is preferably in a range from 0.1 to 100 $\mu$m, and in more preferably in a range from 1 to 20 $\mu$m.

The present invention will be detailed in the form of preferred embodiments to which the present invention should be limited, with reference to the accompanying drawings in which:

DESCRIPTION OF PREFERRED EMBODIMENTS (Embodiment 1)

Figure 1:
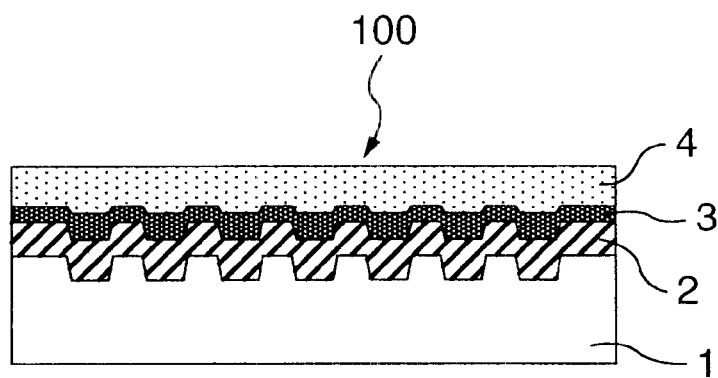
FIG. 1 is a sectional view schematically illustrating a structure of an optical recording medium according to the present invention.

Referring to FIG. 1 which is a schematic sectional view illustrating a write-once type optical recording medium according to the present invention, the write-once optical recording medium 100 is composed of an optical transparent substrate 1 on which an optical absorbing layer 2, an optical reflecting layer 2 and a protecting layer 4 are successively formed. Explanation will be hereibelow made of a method of manufacturing this write-once optical recoding medium 100.

At first, a glass master adapted to be used for manufacturing an optical transparent substrate was manufactured as follows;

First, a polished flat grass substrate was prepared, and the glass substrate is coated thereover with a photoresist adapted to act on ultraviolet radiation, by a predetermined thickness. As to the photoresist, there was used a mixture of polymer of cresol novolak resin and a photosensitizer of naphthoquinon diazido. Then, the glass substrate was set on a turn table in an exposure deice which is not shown, and two kind of laser beams are irradiated onto the phtoresist while the glass substrate was rotated. Thus, a pregroove pattern and a prepit pattern were exposed by the two laser beams, respectively. At this time, the irradiating position of the laser beam for the prepits was shifted in the outer peripheral direction with respect to the irradiating position of the laser beam for the pregroove during this exposure. Further, the powers of the laser beams for the prepits and the pregroves were adjusted, respectively, so as to obtain a predetermined shape of the prepits and a predetermined shape of the pregrooves. Then, with the use of a developer, the thus exposed photoresist was developed. Thus, concavities and convexities corresponding to the pregrooves and the prepits were formed in the photosresist. Thus, the glass master having the pregrooves and the pepits with desired dimensions ware prepared.

Figure 2:
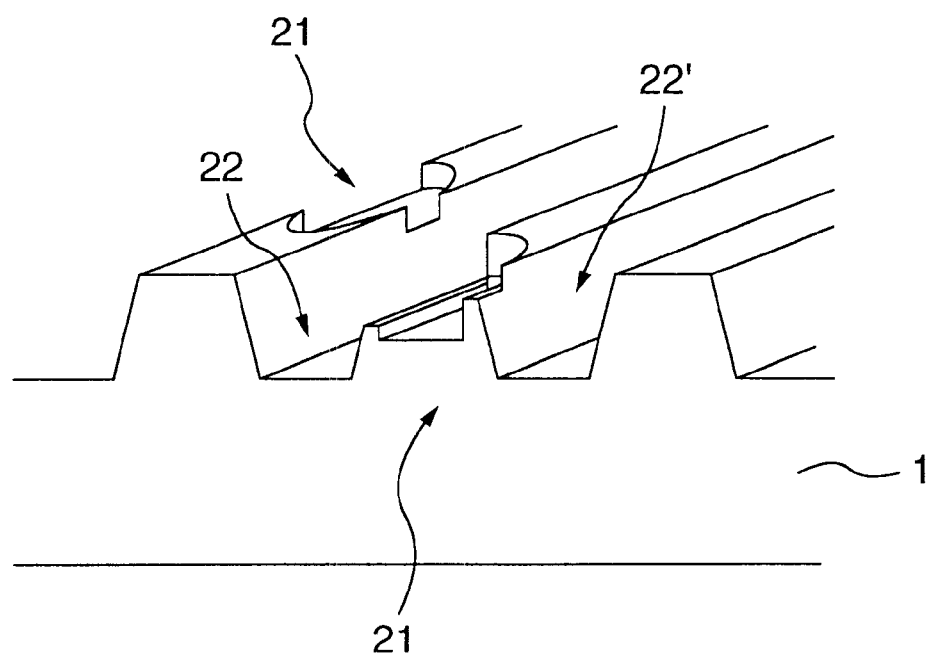
FIG. 2 is an enlarged view illustrating a part of a sectional structure of a substrate, as viewed by cutting the substrate with a plane which is orthogonal to pregrooves and including prepits.

Next, nickel plating was made for the above-mentioned glass mater so as to form a stamper made of nickel. The thus formed stamper is set in dies on an injection molding machine, and polycarbonate resin was injected and charged into the dies so as to obtain an optical transparent substrate 1. The thus formed optical transparent substrate 1 has concentric pergrooves for tracking, having pitches of 0.74 μm, a entire width of 0.32 μm, and the prepits having a shape shown in FIGS. 2, 3 and 4 were formed at predetermined positions on the lands. The pregrooves 22, 22' and the prepits 21 are set apart from each other by the edge parts 23, 23'.

Figure 3:
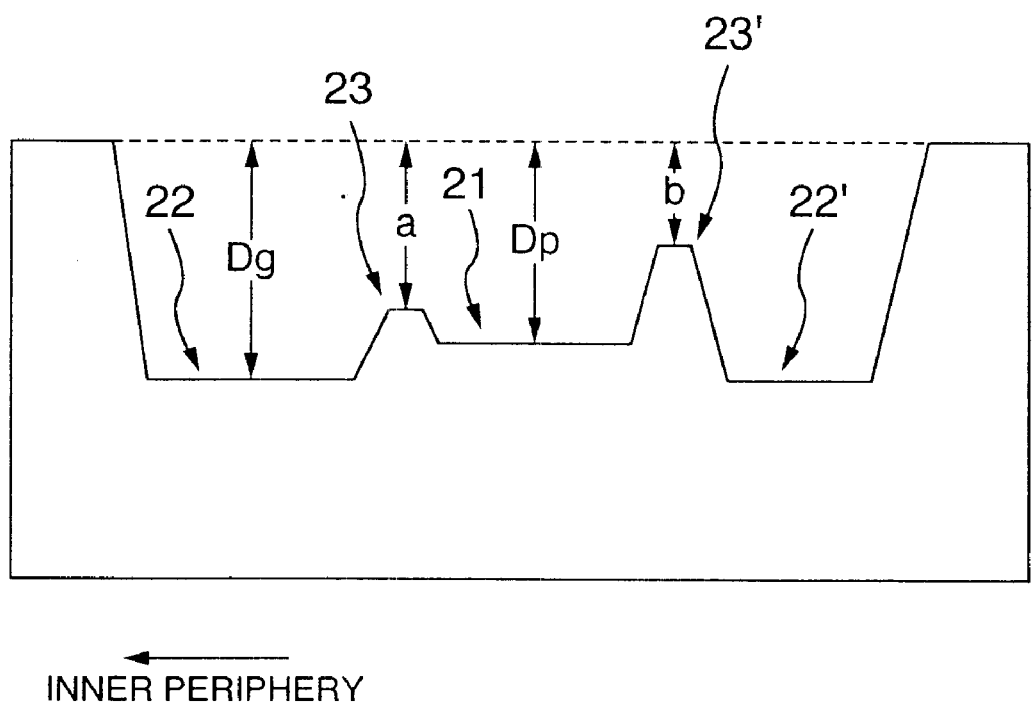
FIG. 3 is a sectional view illustrating a structure of the substrate, as viewed by cutting a substrate with a plane orthogonal to pregrooves, including prepits.
Figure 4:
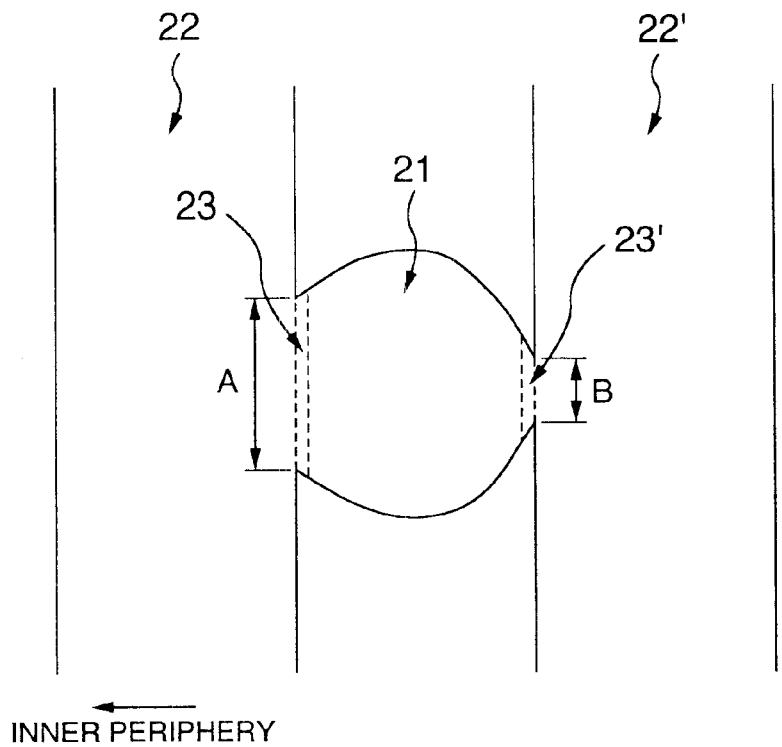
FIG. 4 is a schematic view illustrating prepits formed in a substrate of the optical recording medium according to the present invention, as viewed thereabove.
Figure 5:
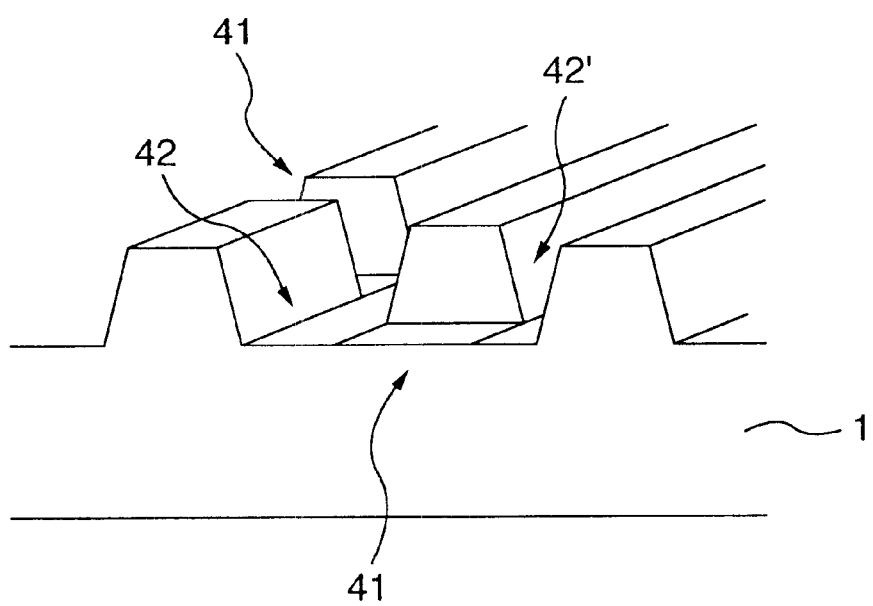
FIG. 5 is a schematic perspective view illustrating a sectional structure of a substrate of a conventional DVD-R.

The maximum depth Dg of the pegrooves Dg as shown in FIG. 3 was 167 nm, the maximum depth Dp of the prepits was 167 nm, the depth a of the edge parts 23 on the inner side of the prepits 21 is 158 nm, and the depth b of the edge parts 23' on the outer side of the prepits 21 was 48 nm. Further, as shown in FIG. 4, the length A of the edge parts 23 on the inner peripheral side of the prepits 21 was 290 nm, and the length B of the edge parts 23' on the outer peripheral side of the prepits 21 was 125 nm in the pregroove direction.

The outer surface of the substrate 1 formed therein with the pregrooves and prepits as mentioned above, was coated thereover with azo group organic pigment which is exhibited by the following formula (I), with the use of a spin coat process so as to form the optical absorbing layer having a thickness of 120 nm. The azo group organic pigment was coated by using tetra fluoropropanol as a solvent.

Next, the optical absorbing layer was coated thereover with Ag with the use of a sputter process so as to form an optical reflecting layer 3 having a thickness of 0.1 μm. Further, the optical reflecting layer 3 was coated thereover with ultraviolet curable resin with the use of a spin coat process so as to form a protecting layer 4 for protecting the optical absorbing layer 2 and the optical reflecting layer 3, having a thickness of 5 μm. After coating, the protecting layer 4 is irradiated thereover with ultraviolet radiation having a predetermined light intensity with the use of an ultraviolet radiation irradiating machine so as to cure the protecting layer 4. Thus, the write-once type optical recording medium 100 having a stacking structure as shown in FIG. 1 was obtained.

The write-once type optical recording medium 100 as prepared as mentioned above, was irradiated thereonto with a laser beam having a wavelength of 635 nm and a power of 8 mW, as exposure light, so as to record image data thereon. The error rate of address signals was 0.4% before recording, and the error rate of the address signals was 0.8% after the recording, which is satisfactory. Thereafter, a laser beam having a wavelength of 650 nm was irradiated with a power of 0.3 mW so as to reproduce the recorded image data while jitter and a block error rate were measured. The jitter was 7.5% and the maximum value of an error number at the 8EEC (Error Correct Code) block was 95. which was satisfactory.

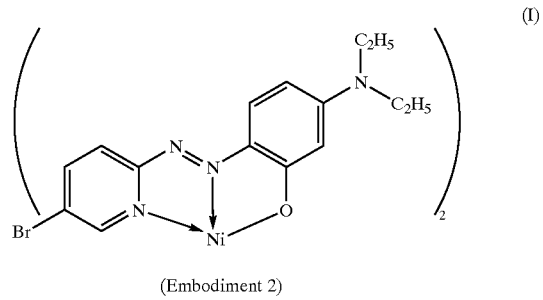

(Embodiment 2)

(Embodiment 2)

There was manufactured a write-once type recording medium similar to that of the embodiment 1, except that, referring to FIG. 3, the maximum depth Dg of the pregrooves 22 was 175 nm, the maximum depth Dp of the prepits 21 was 170 nm, the depth a of the edge parts on the inner side of the pit 22 was 35 nm, and the depth b of the edge parts 23' on the outer side of the prepits 21 was 35 nm, and that, the length A of the edge parts 23 on the inner peripheral side of the prepits 21 was 96 nm in the direction of the pregrooves 22, and the length B of the edge parts 23' on the outer peripheral side of the prepit 21 was 96 nm in the direction of the pregrooves 22'.

The write-once type recording medium 100 was irradiated thereonto with a leaser beam having a wavelength of 635 nm and a power of 8 mW so as to record thereon image data. The error rate of address signals was 0.8% before the recording, but the error rate of address signals becomes 1.8% after the recording, which is satisfactory. Thereafter, by irradiating a leaser beam having a wavelength of 650 nm and a power of 0.3 mW onto the recording medium, the image data recorded were reproduced while the jitter and the block error rate were measured. The jitter was 7.3%, and the maximum error number of 8 ECC (Error Correct Code) block was 85, which are satisfactory.

(Embodiment 3)

There was manufactured a write-once type recording medium similar to that of the embodiment 1, except that, referring to FIG. 3, the maximum depth Dg of the pregrooves 22 was 182 nm, the maximum depth Dp of the prepits 21 was 92 nm, the depth a of the edge parts 23 on the inner side of the prepits 22 was 85 nm, and the depth b of the edge parts 23' on the outer side of the prepits 21 was 80 nm, and that, the length A of the edge parts 23 on the inner peripheral side of the prepits 21 was 310 nm in the pregroove direction, and the length B of the edge part 23' on the outer peripheral side of the prepits 21 was 304 nm in the pregroove direction.

The write-once type recording medium 100 was irradiated thereonto with a leaser beam having a wavelength of 655 nm and a power of 9 mW so as to record thereon image data. The error rate of address signals was 0.9% before the recording, but the error rate of address signals becomes 2.2% after the recording, which is satisfactory. Thereafter, by irradiating a leaser beam having a wavelength of 650 nm and a power of 0.3 mW onto the recording medium, the image data recorded were reproduced while the jitter and the block error rate were measured. The jitter was 7.3%, and the maximum error number of 8 ECC (Error Correct Code) block was 70, which are satisfactory.

Comparison Example 1

There was manufactured a write-once type recording medium similar to that of the embodiment 1, except that, referring to FIG. 3, the maximum depth Dg of the pregrooves 22 was 170 nm, the maximum depth Dp of the prepits 21 was 170 nm, the depth a of the edge parts 23 on the inner side of the prepits 22 was 170 nm, and the depth b of the edge parts 23' of the pregrooves 22' on the outer side of the prepits 21 was 170 nm, and that, the length A of the edge parts 22 on the inner peripheral side of the prepits 21 was 310 nm in the pregroove direction, and the length B of the edge part 23' on the outer peripheral side of the prepits 21 was 312 nm in the pregroove direction.

The write-once type recording medium 100 was irradiated thereonto with a leaser beam having a wavelength of 655 nm and a power of 8 mW so as to record thereon image data. The error rate of address signals was 0.3% before the recording, but the error rate of address signals becomes 1.5% after the recording, which is satisfactory. Thereafter, by irradiating a leaser beam having a wavelength of 650 nm and a power of 0.3 mW onto the recording medium, the image data recorded were reproduced while the jitter and the block error rate were measured. The jitter was 8.2%, and the maximum error number of 8 ECC (Error Correct Code) block was 304. It was found that the error number was increased in comparison with the above-mentioned embodiment.

Comparison Example 2

There was manufactured a write-once type recording medium similar to that of the embodiment 1, except that, referring to FIG. 3, the maximum depth Dg of the pregrooves 22 was 165 nm, the maximum depth Dp of the prepits 21 was 83 nm, the depth a of the edge parts 23 on the inner side of the pits 22 was 12 nm, and the depth b of the edge parts 23' on the outer side of the prepits 21 was 0 nm, and that, the length A of the edge part 23 on the inner peripheral side of the prepits 21 was 80 nm in the pregroove direction, and the length B of the edge parts 23' of the pregroove 22' on the outer peripheral side of the prepits 21 was 0 nm.

The write-once type recording medium 100 was irradiated thereonto with a leaser beam having a wavelength of 635 nm and a power of 9 mW so as to record thereon image data. The error rate of address signals was 5.7% before the recording, but the error rate of address signals became 12.0% after the recording. Thus, it is found that the error rate was increased in comparison with the above-mentioned embodiments. Thereafter, by irradiating a leaser beam having a wavelength of 650 nm and a power of 0.3 mW onto the recording medium, the image data recorded were reproduced while the jitter and the block error rate were measured. The jitter was 7.3%, and the maximum error number of 8 ECC (Error Correct Code) block was 70, which are satisfactory.

Although the explanation has been made of the embodiments of the optical recording medium according to the present invention, the present invention should not be limited to these embodiments, but it goes without saying that it can includes various variant forms of the above-mentioned embodiments. For example, in the above-mentioned embodiments, the write-once recording medium having a single surface layer structure was manufactured as the optical recording medium, as shown in FIG. 1, the present invention should be limited to this write-once type optical recording medium. For example, it may possible to manufacture such a joined type write-once type optical recoding medium that a pair of laminated elements each having an optical absorbing layer and an optical reflecting layer on a substrate, and are then bonded with each other while the substrates thereof are located outside.

With the optical recording medium according to the present invention, the edge parts of the prepits and the pregrooves have heights which are higher than the bottom surfaces of the prepits, and further, the edge parts on the inner peripheral side have a height lower than that of the edge parts on the outer peripheral side. Even though the width of the pregrooves becomes smaller than the diameter of the beam spot due to an increased density, recording pits formed in the pregrooves can be precisely reproduced, thereby it is possible to reduce the jitter and the block error rate of recording signals.

Further, the optical recording medium according to the present invention can be recorded thereon with data with the use of a laser beam having a wavelength in a range of 630 to 640 nm, and accordingly, it can be used as a DVD-R. In this case, the data recorded thereon can be reproduced on a DVD reproducing device.

What is claimed is:

1. An optical recoding medium comprising a substrate formed thereon with prepits between pregrooves, the pregrooves and the prepits being set apart from each other by edge parts therebetween, and an optical absorbing layer and an optical reflecting layer which are formed on the substrate, characterized in that the prepits are formed so as to satisfy the following unequal equation.(1):

$$0<b \leq a<Dp \leq Dg \qquad (1)$$

where Dg is a maximum depth of the pregrooves, Dp is a maximum depth of the prepits, a is a depth of the edge parts on the inner peripheral side of the prepits,and b is a depth of the edge part on the outer peripheral side of the prepits.

2. An optical recording medium as set forth in claim 1, characterized in that a rate a/Dp between the depth a of the edge parts on the inner peripheral side of the prepits, to the maximum depth Dp of the prepits is in a range from 0.20 to 0.95.

3. An optical recording medium as set forth in claim 1 or 2, characterized in that a rate Dp/Dg between the maximum depth Dp of the prepits and the maximum depth Dg of the pegrooves is in a range from 0.50 to 1.00.

4. An optical recording medium as set forth in any one of claim 1 or 2, characterized in that the following unequal equation (2) is satisfied:

$$0<B \leq A \qquad (2)$$

where A is a length of the edge part of the prepits in the longitudinal direction of the pregrooves, and B is a length of the pregrooves on the outer peripheral side with respect to the prepits in the ligitudinal direction of the pregrooves.

* * * * *